(12) United States Patent
Mantrach et al.

(10) Patent No.: US 9,881,059 B2
(45) Date of Patent: Jan. 30, 2018

(54) SYSTEMS AND METHODS FOR SUGGESTING HEADLINES

(71) Applicant: Yahoo Holdings, Inc., Sunnyvale, CA (US)

(72) Inventors: Amin Mantrach, Barcelona (ES); Alejandro Jaimes, Barcelona (ES)

(73) Assignee: YAHOO HOLDINGS, INC., Sunnyvale, CA (US)

( * ) Notice: Subject to any disclaimer, the term of this patent is extended or adjusted under 35 U.S.C. 154(b) by 424 days.

(21) Appl. No.: 14/455,045

(22) Filed: Aug. 8, 2014

(65) Prior Publication Data

US 2016/0041985 A1 Feb. 11, 2016

(51) Int. Cl.
*G06F 3/048* (2013.01)
*G06F 17/30* (2006.01)

(52) U.S. Cl.
CPC .... *G06F 17/3053* (2013.01); *G06F 17/30011* (2013.01); *G06F 17/30867* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0143254 A1* | 6/2006 | Chen | | G06F 17/30663 |
| 2009/0327264 A1* | 12/2009 | Yu | | G06F 17/30864 |
| 2011/0302117 A1* | 12/2011 | Pinckney | | G06Q 30/02 706/12 |
| 2013/0031465 A1* | 1/2013 | Yehaskel | | G06F 17/30867 715/234 |
| 2013/0246432 A1* | 9/2013 | Paskin | | G06F 17/30867 707/740 |
| 2014/0052540 A1* | 2/2014 | Rajaram | | G06Q 30/0255 705/14.66 |
| 2014/0351266 A1* | 11/2014 | Musgrove | | G06F 17/3053 707/748 |
| 2014/0365448 A1* | 12/2014 | Keller | | G06F 3/0237 707/692 |
| 2015/0006286 A1* | 1/2015 | Liu | | G06Q 50/01 705/14.53 |
| 2015/0025977 A1* | 1/2015 | Doyle | | G06Q 50/01 705/14.66 |
| 2015/0046528 A1* | 2/2015 | Piepgrass | | G06F 15/17306 709/204 |
| 2015/0067048 A1* | 3/2015 | Kannan | | H04L 65/40 709/204 |
| 2015/0220658 A1* | 8/2015 | Mukherjee | | G06F 17/30693 707/711 |
| 2015/0317357 A1* | 11/2015 | Harmsen | | G06F 17/30424 707/723 |

(Continued)

OTHER PUBLICATIONS

Machine Learning Approach to Augmenting News Headline Generation by Wang et al. Published 2005. 6 pages.*

(Continued)

*Primary Examiner* — Hien Duong
(74) *Attorney, Agent, or Firm* — Brinks Gilson & Lione

(57) ABSTRACT

Systems and methods for recommending headlines of an article are disclosed. A topic for the article may be chosen based on the article and an original headline. Trending words within the topic that are related to the article are identified and suggested for inclusion in a revised headline.

11 Claims, 7 Drawing Sheets

(56) References Cited

U.S. PATENT DOCUMENTS

2015/0347414 A1* 12/2015 Xiao .................. G06F 17/3053 707/749
2017/0097989 A1* 4/2017 Jarrett ............... G06F 17/30696

OTHER PUBLICATIONS

Automated Natural Language Headline Generation Using Discriminative Machine Learning Models by Gittani, Published 2007. 69 pages.*
Ahmed, Mohamed et al., "A peek into the Future: Predicting the Evolution of Popularity in User Generated Content", *Proceedings of the Sixth ACM International Conference on Wen Search and Data Mining*, WSDM 2013, New York, NY., pp. 607-616.
Baeza-Yates R., et al., "Modern Information Retrieval", copyright by AMC Press, 1999, 103 pgs.
Bandari, Roja et al., "The Pulse of News in Social Media: Forecasting Popularity", *Proceeding form the Sixth International AAAI Conference on Weblog and Social Media*, 2012, pp. 26-33.
Banko, Michele, et al, "Headline Generation Based on Statistical Translation", *Proceeding of the 38th Annual Meeting on Association for Computational Linguistics*, 2000, 8 pgs.
Barbieri, Nicola et al., "An Analysis of Probabilistic Methods for Top-N Recommendation in Collaborative Filtering", *Machine Learning and Knowledge Discovery in Databases*, D. Gunopulos et al. (Eds.), 2011, pp. 172-173.
Benton, Joshua, "A/B testing for headlines: Now available for WordPress", *Nieman Foundation Lab at Harvard*, 2010, 3 pgs.
Blei, David M. et al., "Latent Dirichlet Allocation", *Journal of Machine Learning Research*, 2003, vol. 3, 8 pgs.
Dorr, Bonnie et al., "Hedge Trimmer: A Parse-and-Trim Approach to Headline Generation", *Proceedings of the HLT-NAACL 03 on Text summarization workshop*, 2003, vol. 5, 8 pgs.
Graepel, Thore, "Web-Scale Bayesian Click-Through Rate Prediction for Sponsored Search Advertising in Microsoft's Bing Search Engine", *Proceedings of the 27th International Conference on Machine Learning*, 2010, 8 pgs.
Griffiths, Thomas L. et al., "Finding scientific topics", *PNAS*, 2004, vol. 101, Suppl. 1, pp. 5228-5235.
Ifantidou, Elly, "Newspapers headlines and relevance: Ad hoc concepts in ad hoc contexts", *Journal of Pragmatics*, 2009, vol. 41, pp. 699-720.
Konig, Arnd Christian et al., "Click-Through Prediction for News Queries", *Proceedings of the 32nd International ACM Conference on Research and development in information retrieval*, 2009, 8 pgs.
Liu, Yan et al., "Topic-Link LDA: Joint Models of Topic and Author Community", *Proceedings of the 26th Annual International Conference on Machine Learning*, 2009, 8 pgs.
Mihalcea, Rada et al., "TextRank: Brings Order into Texts", *Proceedings of EMNLP*, 2004, Barcelona, Spain, 8 pgs.
Richardson, Matthew et al., "Predicting Clicks: Estimating the Click-Through Rate for News Ads", *Proceedings of the 16th International Conference on World Wide Web*, 2007, pp. 521-529.
Seward, Zachary M., "How the Huffington Post uses real-time testing to write better headlines", *Nieman Foundation Lab at Harvard*, 2009, 3 pgs.
Shie, Jian-Shiung, "Metaphors and metonymies in New York Times and Times Supplement news headlines", *Journal of Pragmatics*, 2011, vol. 43, pp. 1318-1334.
Szabo, Gabor et al., "Predicting the Popularity of Online Content", *Communications of the AMC*, 2010, 2010, vol. 53, No. 8, pp. 80-88.
Van Dijk, Teun A., "News as Discourse", Copyright 1998, Lawrence Erlbaum Associates Publishers, 201 pgs.
Wan, Stephen et al., "Using Thematic Information in Statistical Headline Generation", *Proceedings of the Acl 2003 Workshop on Multilingual summarization and question answering*, 2003, 10 pgs.
Xu, Songhua yet al., "Keyword Extraction and Headline Generation Using Novel Word Features", *Proceedings of the 24th AAAI Conference on Artificial Intelligence*, 2010, pp. 1461-1466.
Zajic David et al., "Automatic Headline Generation for Newspapers Stories", *Workshop on Automatic Summarization*, 2002, 9 pgs.

* cited by examiner

SYSTEMS AND METHODS FOR SUGGESTING HEADLINES

BACKGROUND

1. Technical Field

The disclosed embodiments are related to publishing articles and more particularly to suggesting headlines to editors in order to improve an article's popularity.

2. Background

The popularity of news articles depends partly on the quality of their headlines. Many tabloids, in particular, excel in such task. In recent years a fast decline in print readership, coupled with spectacular growth in on-line news consumption have created new challenges for the traditional journalism establishment. This ranges from new types of journalism, to new distribution methods and sources, to the need to create new business models. As a consequence, journalism is experiencing an unprecedented change and significant competition, particularly on-line.

As news sources have multiplied, so have the number of articles that describe the same news event. This is readily visible as searching for any news worthy topic on any given day is likely to yield thousands of results. At the same time, the rise of online social media has brought several changes in the news business. First, the pace at which news is produced and consumed has significantly increased. For example, as soon as a newsworthy event occurs, news about the event are produced, shared, and read worldwide in multiple devices and forums. Second, the number of articles a user is exposed to on a daily basis has increased significantly. Users can visit multiple news media sites, and each site can potentially host a nearly unlimited number of articles.

The increase in both news production and changes in user behavior have generated significant competition for users' attention, in a type of marketplace where different headlines "compete" for a user's click (both within a particular page and across social media). In many ways this is not new, and of course, Tabloids, in particular have historically been the masters of grabbing reader's attention with classic headlines such as "Ford to City: Drop Dead" and "Headless Body in Topless Bar" (headline which inspired a movie of the same name) Arguably, the "art of headline writing" is a skill developed by journalists that requires creativity and use of some good ground rules. A good headline summarizes the news article, but entices the reader to want to read more. Guidelines include, for example, that wording should be specific, with emphasis on active verbs, in future or present tense, etc.

The combination of a surge in online news production and consumption, datasets of user click behavior, and advanced machine learning techniques, presents a singular opportunity for large-scale data-driven analysis of this art, as well as for building predictive models. Good headlines have been historically important in attracting readers, but with online news, the difference between a good and a bad headline for a single article can have important revenue impact, affect the propagation of the story in social media, and result in either growth or decline of readership. Despite the potential and significance of a systematic approach to headlines there has not been much scientific research on this topic and journalists still rely on intuition and hand crafted rules of thumb.

It would be beneficial to develop systems and methods for recommending headlines that are more likely to be clicked through.

BRIEF SUMMARY

In one aspect, a computer implemented method for suggesting headlines is disclosed. The method includes receiving at a computing device an input of a headline and an article associated with the headline, determining, by a computing device, a topic associated with the article and headline; determining, by a computing device, at least one word trending in the topic; and recommending the at least one word trending in the topic for use in a revised headline.

In some embodiments determining at least one word trending in the topic includes determining a plurality of words associated with the topic, determining a topical click value for each word of the plurality of words associated with the topic, and the at least one word trending in the topic corresponds to words having a higher topical click value from among the plurality of words associated with the topic. In some embodiments determining at least one word trending in the topic includes inputting at least a portion of the headline and the article into a headline click-based topic model to determine a word click through rate for at least one word associated with the article.

In some embodiments the headline click-based topic model is trained using search logs and historic click through data. The search logs and historic click through data may be filtered to remove common words. The at least one word may include at least one bigram formed of two words.

In another aspect a computer implemented method for evaluating the effectiveness of a headline is disclosed. The method includes receiving at a computing device a headline and an article associated with the headline, determining, by a computing device, a topic associated with the article and headline, scoring at least one word within the headline based on trending words within the topic associated with the article and headline, and determining a headline score indicative of a relative likelihood of the headline being clicked through. In some embodiments the method further includes outputting at least one recommended word for inclusion in a revised headline.

In some embodiments, scoring at least one word trending in the topic may include determining a topical click value for at least one word contained in the headline. In other embodiments, scoring at least one word trending in the topic includes inputting at least a portion of the headline and the article into a headline click-based topic model to determine a word click through rate for at least one word in the title.

In some embodiments the method may further include training the headline click-based topic model using historic search data and historic click data. In some embodiments the at least one word within the headline comprises at least one bigram.

In another aspect a system for suggesting headline terms is disclosed. The system includes a computer executed module configured to receive an article and a headline associated with the article, a computer executed module configured to determine a topic associated with the article, a computer executed module configured to determine at least one word trending in the topic associated with the article, and a computer executed module configured assign a word click through rate to the at least one word trending in the topic. In some embodiments the system may further include a computer executed module configured to suggest at least one word from among the at least one word trending in the topic based on its word click through rate.

In some embodiments the at least one word is a word contained in the headline and the system further includes a computer executed module configured to calculate a headline click through rate score based on the word click through rate of the at least one word.

In some embodiments the system may further include a computer executed module configured to implement a headline click-based topic model, a computer executed module configured to receive historic search data and historic click through data, and a computer executed module configured to train the headline click-based topic model using the historic search data and historic click through data. The word click through rate may be determined using the trained headline click-based topic model.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, the disclosed embodiments relate to systems and methods for rewriting search queries. The systems and methods are able to rewrite a search query taking into account a user's type of device while maximizing commerciability. The systems and methods may also generate keywords for recommendation to advertisers.

Network

Figure 1:
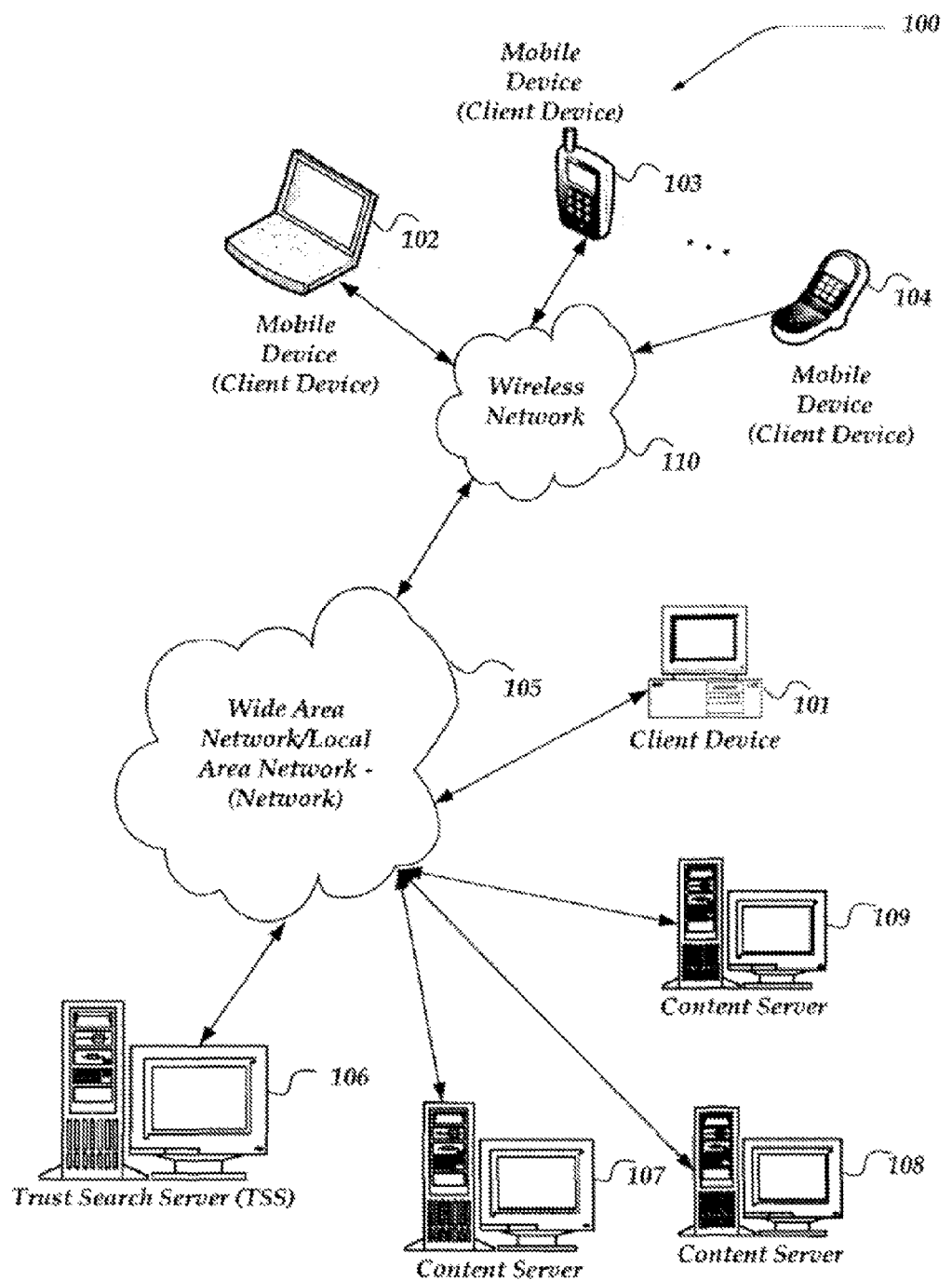
FIG. 1 illustrates an exemplary embodiment of a network system suitable for practicing the invention.

FIG. 1 is a schematic diagram illustrating an example embodiment of a network 100 suitable for practicing the claimed subject matter. Other embodiments may vary, for example, in terms of arrangement or in terms of type of components, and are also intended to be included within claimed subject matter. Furthermore, each component may be formed from multiple components. The example network 100 of FIG. 1 may include one or more networks, such as local area network (LAN)/wide area network (WAN) 105 and wireless network 110, interconnecting a variety of devices, such as client device 101, mobile devices 102, 103, and 104, servers 107, 108, and 109, and search server 106.

The network 100 may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Computing Device

Figure 2:
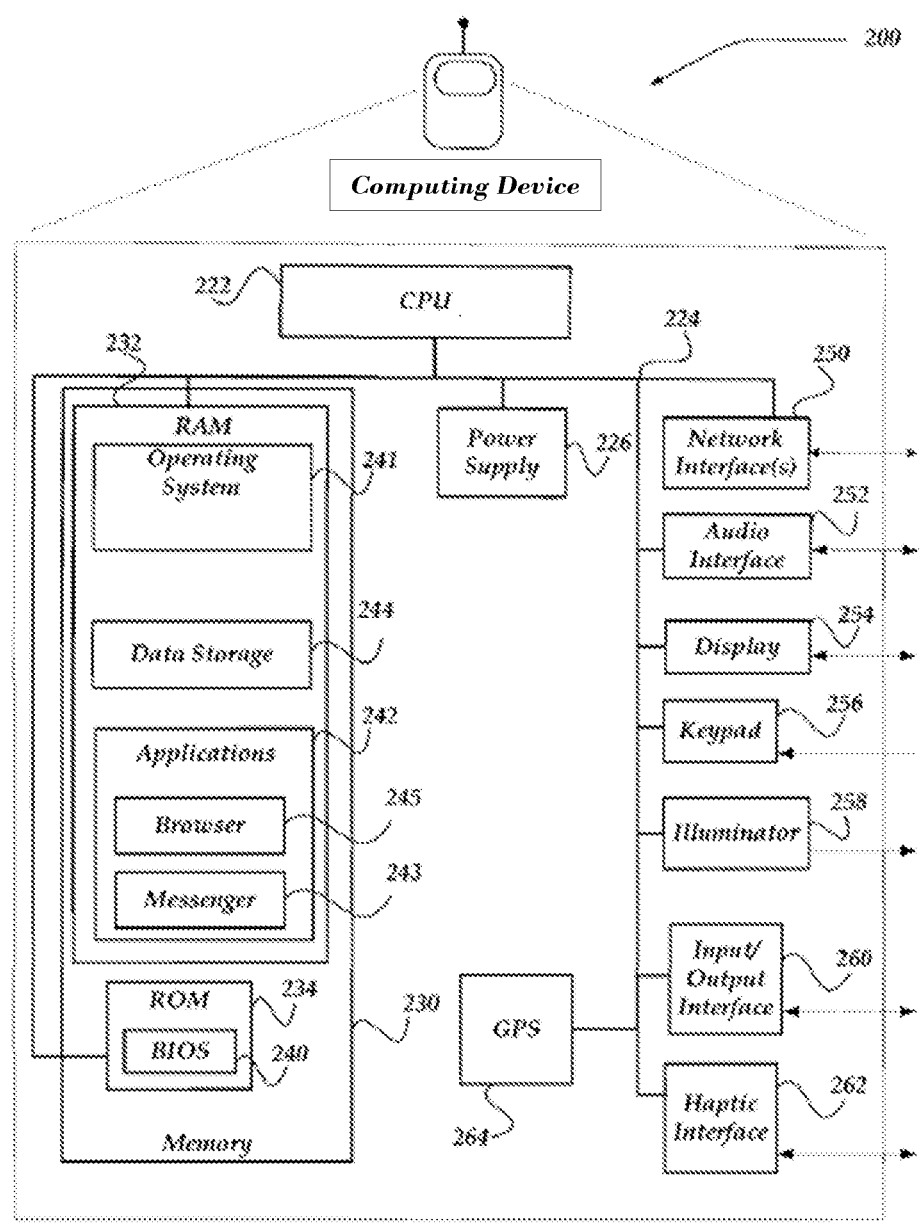
FIG. 2 illustrates a schematic of a computing device suitable for practicing the invention.

FIG. 2 shows one example schematic of an embodiment of a computing device 200 that may be used to practice the claimed subject matter. The computing device 200 includes a memory 230 that stores computer readable data. The memory 230 may include random access memory (RAM) 232 and read only memory (ROM) 234. The ROM 234 may include memory storing a basic input output system (BIOS) 230 for interfacing with the hardware of the client device 200. The RAM 232 may include an operating system 241, data storage 244, and applications 242 including a browser 245 and a messenger 243. A central processing unit (CPU) 222 executes computer instructions to implement functions. A power supply 226 supplies power to the memory 230, the CPU 222, and other components. The CPU 222, the memory 230, and other devices may be interconnected by a bus 224 operable to communicate between the different components. The computing device 200 may further include components interconnected to the bus 224 such as a network interface 250 that provides an interface between the computing device 200 and a network, an audio interface 252 that provides auditory input and output with the computing device 200, a display 254 for displaying information, a keypad 256 for inputting information, an illuminator 258 for displaying visual indications, an input/output interface 260 for interfacing with other input/output devices, haptic feedback interface 262 for providing tactile feedback, and a global positioning system 264 for determining a geographical location.

Client Device

A client device is a computing device 200 used by a client and may be capable of sending or receiving signals via the wired or the wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features and need not contain all of the components described above in relation to a computing device. Similarly, a client device may have other components that were not previously described. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Flickr, or Google+, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

Servers

A server is a computing device 200 that provides services. Servers vary in application and capabilities and need not contain all of the components of the exemplary computing device 200. Additionally, a server may contain additional components not shown in the exemplary computing device 200. In some embodiments a computing device 200 may operate as both a client device and a server.

Features of the claimed subject matter may be carried out by a content server. A content server may include a computing device 200 that includes a configuration to provide content via a network to another computing device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc. A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example. Examples of devices that may operate as a content server include desktop computers, multiprocessor systems, microprocessor-type or programmable consumer electronics, etc.

Searching

A search engine may enable a device, such as a client device, to search for files of interest using a search query. Typically, a search engine may be accessed by a client device via one or more servers. A search engine may, for example, in one illustrative embodiment, comprise a crawler component, an indexer component, an index storage component, a search component, a ranking component, a cache, a profile storage component, a logon component, a profile builder, and one or more application program interfaces (APIs). A search engine may be deployed in a distributed manner, such as via a set of distributed servers, for example. Components may be duplicated within a network, such as for redundancy or better access.

A crawler may be operable to communicate with a variety of content servers, typically via a network. In some embodiments, a crawler starts with a list of URLs to visit. The list is called the seed list. As the crawler visits the URLs in the seed list, it identifies all the hyperlinks in the page and adds them to a list of URLs to visit, called the crawl frontier. URLs from the crawler frontier are recursively visited according to a set of policies. A crawler typically retrieves files by generating a copy for storage, such as local cache storage. A cache refers to a persistent storage device. A crawler may likewise follow links, such as HTTP hyperlinks, in the retrieved file to additional files and may retrieve those files by generating copy for storage, and so forth. A crawler may therefore retrieve files from a plurality of content servers as it "crawls" across a network.

An indexer may be operable to generate an index of content, including associated contextual content, such as for one or more databases, which may be searched to locate content, including contextual content. An index may include index entries, wherein an index entry may be assigned a value referred to as a weight. An index entry may include a portion of the database. In some embodiments, an indexer may use an inverted index that stores a mapping from content to its locations in a database file, or in a document or a set of documents. A record level inverted index contains a list of references to documents for each word. A word level inverted index additionally contains the positions of each word within a document. A weight for an index entry may be assigned. For example, a weight may be assigned substantially in accordance with a difference between the number of records indexed without the index entry and the number of records indexed with the index entry.

The term "Boolean search engine" refers to a search engine capable of parsing Boolean-style syntax, such as may be used in a search query. A Boolean search engine may allow the use of Boolean operators (such as AND, OR, NOT, or XOR) to specify a logical relationship between search terms. For example, the search query "college OR university" may return results with "college," results with "university," or results with both, while the search query "college XOR university" may return results with "college" or results with "university," but not results with both.

In contrast to Boolean-style syntax, "semantic search" refers a search technique in which search results are evaluated for relevance based at least in part on contextual meaning associated with query search terms. In contrast with Boolean-style syntax to specify a relationship between search terms, a semantic search may attempt to infer a meaning for terms of a natural language search query. Semantic search may therefore employ "semantics" (e.g., science of meaning in language) to search repositories of various types of content.

Search results located during a search of an index performed in response to a search query submission may typically be ranked. An index may include entries with an index entry assigned a value referred to as a weight. A search query may comprise search query terms, wherein a query term may correspond to an index entry. In an embodiment, search results may be ranked by scoring located files or records, for example, such as in accordance with number of times a query term occurs weighed in accordance with a weight assigned to an index entry corresponding to the query term. Other aspects may also affect ranking, such as, for example, proximity of query terms within a located record or file, or semantic usage, for example. A score and an identifier for a located record or file, for example, may be stored in a respective entry of a ranking list. A list of search results may be ranked in accordance with scores, which may, for example, be provided in response to a search query. In some embodiments, machine-learned ranking (MLR) models are used to rank search results. MLR is a type of supervised or semi-supervised machine learning problem with the goal to automatically construct a ranking model from training data.

Content within a repository of media or multimedia, for example, may be annotated. Examples of content may include text, images, audio, video, or the like, which may be processed in the form of physical signals, such as electrical signals, for example, or may be stored in memory, as physical states, for example. Content may be contained within an object, such as a Web object, Web page, Web site, electronic document, or the like. An item in a collection of content may be referred to as an "item of content" or a "content item," and may be retrieved from a "Web of Objects" comprising objects made up of a variety of types of content. The term "annotation," as used herein, refers to descriptive or contextual content related to a content item, for example, collected from an individual, such as a user, and stored in association with the individual or the content item. Annotations may include various fields of descriptive content, such as a rating of a document, a list of keywords identifying topics of a document, etc.

Headline Click-Based Topic Model

A topic model may be used for suggesting headlines. It is assumed that each word has an intrinsic click value, and that click value is correlated with the topical context in which it is used. For example, celebrity names such as "Lionel Messi" or "Cristiano Ronaldo" are more important in the context of a "Sports" article than in the context of a "Business" or "Politics" article.

Figure 3:
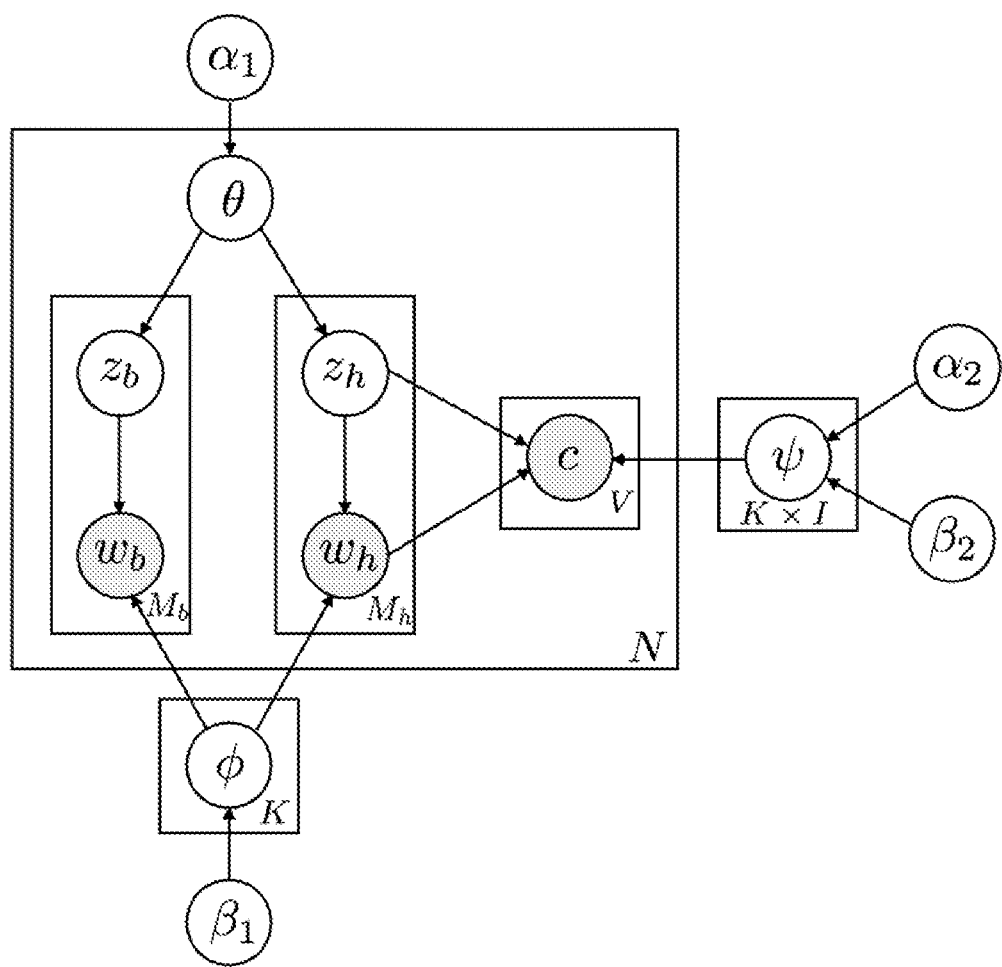
FIG. 3 illustrates a graphical representation of a headline click-based topic model.

Headline click-based topic model (HCTM) is used to jointly model topics of an article, words in the headline, and users' clicks. The model extends traditional Latent Dirichlet Allocation (LDA), as described in D. M. Blei, A. Y. Ng, and M. I. Jordan. Latent dirichlet allocation. *the Journal of machine Learning research*, 3:993-1022, 2003, which is herein incorporated by reference in its entirety. The model accounts for actual clicks that are observable, and the potential of each word in the headline to induce clicks. To analyze user clicks, the analysis considers cases of user being presented with a headline on a Webpage, and a click occurs if the user actually clicks on the headline. FIG. 3 illustrates a graphical representation of HCTM and table 1 lists the variable used in the generative model.

TABLE 1

| | |
|---|---|
| D | the number of news articles |
| $M_h$ | the number of words in headline of the articles |
| $M_b$ | the number of words in body of the articles |
| $V_d$ | the number of times the article d is shown to users (number of views) |
| K | the number of topics |
| I | the number of unique words |
| θ | topic distribution of the news article (a multinomial distribution over topics) |
| φ | word distribution of topics (a multinomial distribution over words) |
| ψ | topic-specific click value of words (a real number between 0 and 1) |
| zh | topic of a word in headline |
| wh | a word in headline |
| zb | topic of a word in body |
| wb | a word in body |
| c | a click (1 for clicked, 0 for not clicked) |

More specifically, HCTM includes an observable variable, c, for user clicks where $c_j^d=1$ if the jth user who views headline d clicks on the headline, and $c_j^d=0$ if the jth user does not click on the headline. HCTM further includes a latent variable ψ for the topic-specific click value of each word. The latent indicator variable of topics, typically a single set z, in HCTM is separated into two, $z_h$ for generating the headline of the news, and $z_b$ for generating its content. The former hidden variable, $z_h$, guides the generation of clicks. HCTM models the distribution of click value, ψ, as a Beta distribution, and the distribution of clicks, c, as a Binomial distribution and utilizes the Beta-Binomial conjugacy in posterior inference to provide a full generative Bayesian model.

A formal description of the generative process is as follows:

1. For each topic k∈K, (a) Draw word distribution $\varphi_k \sim Dir(\beta_1)$

2. For each topic-word pair (z,w)∈K×N, (a) Draw click value $\psi_{z,w} \sim Beta(\alpha_2, \beta_2)$ 3. For each document d,
   (a) Draw topic distribution $\varphi_d \sim \text{Dir}(\alpha_1)$
   (b) For each word j in headline,
      i. Draw topic $z_h^{jd} \sim \text{Mult}(\theta_d)$
      ii. Draw word $w_h^{jd} \sim \text{Mult}(\varphi_{zh})$
   (c) For each word i in body,
      i. Draw topic $z_b^{id} \sim \text{Mult}(\theta_d)$
      ii. Draw word $w_b^{jd} \sim \text{Mult}(\varphi_{zb})$
   (d) For each user view $v \in [1, V_d]$,
      i. Draw word $w_v^d$ from headline
      ii. Draw click $c_v^d \sim \text{Bin}(\psi_{z_v^d, w_v^d})$ Model Inference A Markov Chain Monte Carlo algorithm may be used for posterior sampling. More precisely, the collapse Gibbs sampling approach described in T. L. Griffiths and M. Steyvers. Finding scientific topics. *Proceedings of the National academy of Sciences of the United States of America*, 101(Suppl. 1):5228-5235, 2004, which is incorporated by reference in its entirety, may be used in which:

$$p(w_b, w_h, z, c, \theta, \psi, \phi) = p(\psi | \alpha_2, \beta_2) p(\phi | \beta_1)$$

$$\prod_{d=1}^{N} p(\theta_d | \alpha_1) \prod_{i=1}^{M_b} p(z_b^{id} | \theta_d) p(w_b^{id} | z_b^{id})$$

$$\prod_{j=1}^{M_h} p(z_h^{jd} | \theta_d) p(w_h^{jd} | z_h^{jd}) \prod_{v=1}^{V} p(c_v^d | \psi_{z_h^{jd}, w_h^{jd}})$$

The Dirichlet-Multinomial conjugacy may be used to write out the conditional distribution of $w_h$. Note that the summation should be taken over both headline words $w_h$ and body words $w_b$. Here j' is used to account for both domains of words for simplification. Conditional distribution of $w_b$ may be computed in the same manner.

$$p(w_h^{jd} | w_h^{-jd}, w_b, z_h^{jd}) = \frac{\sum_{j'd' \neq jd} 1[z_h^{j'd'}, w_h^{jd}, w_h^{j'd'} = w_h^{jd}] + \beta_1}{\sum_{j'd' \neq jd} 1[z_h^{j'd'} = z_h^{jd}] + N\beta_1}$$

The conditional distribution of $z_b^{id}$ given word $w_b^{id}$ is proportional to the number of times topic $z_b^{id}$ is used in the document d multiplied by the conditional probability of $w_b^{id}$ given $z_b^{id}$.

$$p(z_b^{id} = z | \text{rest}) \propto n_{zd}^{-id} \times p(w_b^{id} | w_h^{id}, w_h, z_b^{id} = z)$$

where $n_{zd}^{-id}$ indicates the number of times topic z is assigned in document d without counting $z_b^{id}$.

The posterior sampling of $z_h^{jd}$ involves an estimation of click value. The probability distribution of click variable $c_v^d$ can be written as follows:

$$p(c_v^d | w_v^d, \psi) \sim \text{Bin}(\psi_{z_v^d, w_v^d})$$

where $w_v^d$ is the headline word associated with the click $c_v^d$ and $z_v^d$ is its currently assigned topic. A click variable is associated with a word in a headline at each iteration of sampling. For each $c_v^d$, a word $w_v^d$ is drawn from the headline words $w_h^d$ with probability proportional to its click value $\psi_{z_v^d, w_v^d}$.

The Beta-Binomial conjugacy may be used to write out the conditional distribution of $\psi$ given observations on clicks, headline words and their topics.

$$\psi_{z,w} | z, w, c \sim \text{Beta}(m_{z,w}^1 + \alpha_2, m_{z,w}^0 + \beta_2)$$

where $m_{z,w}^1$ is the number of times click variable c is associated with topic z and word w is observed to be 1 (clicked), and $m_{z,w}^0$ is the number of times it is observed to be 0 (not clicked).

The conditional distribution of $z_h$ is proportional to the number of times topic $z_b^{jd}$ is used in document d multiplied by the conditional probability of word $w_h^{jd}$ and the likelihood of clicks associated with $w_h^{jd}$ $$p(z_h^{jd} = z | \text{rest}) \propto n_{zd}^{-jd} \times p(w_h^{jd} | w_h^{-jd}, w_b, z_h^{jd} = z) \times \prod_{v \in W_v^d} p(c_v^d | w_v^d, \psi)$$

To verify the preceding, a large set of articles published on the Yahoo homepage and their corresponding click through rate data was analyzed. A user visiting the homepage might perform several actions including checking mail, browsing photos, or reading news. In the analysis, only user sessions which contain at least one click on a news article are considered. News articles published over a period of four months, from March to June 2013, were considered and the number of times the article was clicked was extracted. Articles viewed less than 10 times were filtered out, and a random sample of 150,000 articles was selected.

The extent to which individual words in a headline can impact the click through rate of a headline was investigated. More precisely, it is hypothesized that each word carries an intrinsic value depending on the current trends and interest manifested by online users, as expressed by click through rate. In particular, a click through rate value may be assigned to each individual word in a given headline, defining a new measure: word Click-Through Rate (wCTR), that computes the click value of individual headline words in a given time period. CTR is widely used to measure the click value of a news article. CTR of a news article d is defined as $$CTR(d) = \frac{\text{click}(d)}{\text{views}(d)}$$

where views(d) is the number of times an article d is shown to any user, and click(d) is the number of times the article d is actually clicked.

On a given day, a word w can appear in multiple headlines, and on multiple user sessions. wCTR is defined as a word w at day t as $$wCTR(w/t) = \frac{\text{click}(w, t)}{\text{views}(w, t)}$$

where views(w,t) is the number of times an article that contains w in the headline is shown to users on day t, and click(w,t) is the number of times such articles are clicked. In other words, a high wCTR value suggests that the word generates more clicks than others. Table 2 gives an actual example of CTR and wCTR for the headline *Police: Bombing Suspects Planned More Attacks*, which is in the sample of articles.

TABLE 2

| Headline (CTR) | Police: (wCTR) | Bombing (wCTR) | Suspects (wCTR) | Planned (wCTR) | More (wCTR) | Attacks (wCTR) |
|---|---|---|---|---|---|---|
| .0659 | 0.0698 | 0.0601 | 0.0740 | 0.0484 | 0.0531 | 0.0515 |

The extent to which headlines in the previous week explain the variability of the current CTR may be verified by assigning a score to each headline, wCTRh, obtained by averaging the wCTRs of its associated words. Bigrams are generated from both headlines and bodies of news articles and simple linguistic filtering is performed on both unigrams and bigrams based on word frequency. Words that occur in more than ten percent of the sampled articles are removed as stop words, and words that occur less than five times are removed as noise. It should be noted that bigrams are important in "picking up" important topics or entities that consist of two words (e.g., "Boston Bombing", celebrity names). In addition, a regression analysis may be performed to examine the power of wCTRh in predicting the CTR of articles. A linear regression model may be fitted with an intercept on pairs of points (wCTRh, CTR) for a period of one week, and then the model may be used to predict the CTR of the following day. This operation may be repeated on a time window of one week, by sliding the training period by one day in order to cover the three months of data. The predicted CTR was found to be positively weakly correlated with the measured CTR ($r=0.336$ and $r^2=0.113$). This result where t is the number of total days, and wCTR(w,i) is the wCTR of the term w computed exclusively on data published day i. By ranking words based on their mean and daily variation of their wCTR value, clusters of words may be observed with similar patterns. For example, celebrity related words have high mean click value, whereas business related words have low mean click value. This suggests that celebrity names attract more clicks when shown to the user than business related words. This finding on the dataset confirms recent findings in the domain of news forecasting where the authors have shown that named entities help in predicting popular news articles. Furthermore, interestingly, function words such as preposition and determiner have very low delta value, and their mean wCTR value is very close to the global average (0.0571), which means that their click value does not change over time, and they have little effect on the headline regardless of the time period or the context they are used in.

The described model may be used in unsupervised data analysis. The model discovers trends in user interests (in terms of clicks on the headline) as well as topics from the corpus. In Table 3, 3 topics ($\varphi_k$) that are manually identify as Sport, Economy and Technology and their respective high click value words ($\psi_k$) tracked during two consecutive weeks. The match between topics in consecutive time is done by associating each topic of one week to the most similar one from the next week in terms of KL divergence. For topics, the top ten words are illustrated in terms of word likelihood given topic ($\varphi_{k,i}$). For clicks, the top ten words are illustrated in terms of topic-specific click value ($\psi_{k,i}$).

| Sport | | | | Technology | | | | Economy | | | |
|---|---|---|---|---|---|---|---|---|---|---|---|
| Week 1 | | Week 2 | | Week 1 | | Week 2 | | Week 1 | | Week 2 | |
| Topic | Click | Topic | Click | Topic | Click | Topic | Click | Topic | Click | Topic | Click |
| season | angi | game | punch | microsoft | upgrad | appl | ballmier | bank | bloomber | bank | rio |
| team | robben | hit | locker | appl | siri | googl | failur | ceo | mike | debt | jamaica |
| final | 6 | win | reliev | googl | loop | mobil | laptop | fund | eu | countri | nigeria |
| coach | covert | inning | victori | game | duty | microsoft | familiar | board | june | euro | malaysia |
| leagu | psych | seri | resum | xbox | io | amazon | chromeb | financi | center | bond | cite |
| player | castl | season | suspend | technolog | slate | samsung | smallest | mcttest | form | europ | tragic |
| game | matt | beat | hamilton | mobil | taxi | technolog | radic | _rm | auditor | european | 400 |
| sport | scoop | score | marvel | comput | fuxx | devic | threat | sharehold | herbalif | _nanci | caico |
| nba | curri | team | phantom | phone | destroy | intel | effort | capit | Iceland | itali | guarante |
| nbc | goal | preview | cam | smartpho | array | phone | malwar | jpmorgan | faith | interest | island | indicates that the current articles' CTR can not be explained only from wCTRh of past headlines. This is not surprising, as it has already been shown in the literature that predicting the future CTR of a news article is a difficult task and requires the use of other features rather than just the headline. However, it remains that 11.3% of the variability of the current articles' CTR can already be explained by the prior week's wCTR values.

Temporal patterns of wCTR value may be analyzed to discover interesting groups of words. The wCTR value of each word w may be computing each day exclusively on the data published that same day. Then, the mean of wCTR for each word (wCTR(w)) may be computed as well as its average daily variation ($\Delta(w)$) calculated as follows:

$$\Delta(w) = \frac{1}{t-1} \sum_{i=1}^{t-1} (wCTR(w, i+1) - wCTR(w, i))^2$$

The result shows two interesting patterns in how topics and their respective click values are related. First, topics account for general terms that describe certain category whereas high click value words involve more specific details such as names of people, locations, or special events. Second, high click value words change more rapidly than topics. For instance, company names such as microsoft, apple, google are top words of the technology topic. However, the technology topic high click words vary significantly with no overlapping words. This illustrates how fast user interest changes over time even within the same domain. The described model is capable of accounting for both semantic groups of words as topics and temporal trends of user interest as click value.

The model may be evaluated to determine how well it generates headlines for a given news article. The models performance can be measured based on Area Under the ROC Curve (AUC), and Mean Average Precision (MAP). The model may then be compared with other existing algorithms for headline suggestion.

To assess the predictive power of the model for headline suggestion the following experimental setup may be applied.

A moving time window of seven days is maintained to train the model, and after learning, the predictive power of the model is tested on the data displayed to users the eighth day. For instance, the model may trained on the news and click data from March 1 to March 7, and tested on the data from March 8. For each news article in the test data, the trained model first learns its topic based on the contents of news article, and gives each word a score based on its likelihood as a headline word. Formally, the score for each word j is computed to be in the headline h of document d as $$p(w_h^{jd} | \theta_d, \psi) \propto \prod_k p(z_h^k | \theta_d) p(w_h^{jd} | z_h^k) \psi_{z_h^k, w_h^{jd}}$$

The results are averaged on 10 folds where the starting day of the training period have been randomly chosen among the three months period of the studied data (except the last seven days that obviously could not be used for training).

To evaluate the model, trained models are provided with the test data: news content articles (i.e. the body) without headline. Each model measures headline score of words in the article, and produces a rank-ordered list of words. The following describes how each model is trained, and the headline score for each word is produced.

a. Baseline (wCTR) An average wCTR value is assigned to each word in the vocabulary using the training data. When a word does not have a score (i.e. in the case the word did not appear in any headline of the training set), an average wCTR score is given. A wCTR is assigned to each word appearing in the content equal to the product of its tf idf value and its average wCTR value. Each word of the content is finally ranked as a headline candidate based on its value.

b. Graph-based (TextRank) is a widely used algorithm for text summarization. For each document, a graph of words is drawn where each word in a document is represented as a node in the graph. An edge is given between two nodes if the relevant words are placed within the window of seven words in the document. Eigenvalue centrality of nodes is measured. Each word is given a headline score equal to its centrality.

c. Content-based (LDA) Topic Models such as LSA and LDA have also been widely used for document summarization as they excel in capturing thematic gist of documents. LDA learns topic distribution of each document, and word distribution of each topic. After training, LDA infers topic distribution for test documents. A score is given to each word in a document, equal to its posterior probability based on the model. For the comparison, the number of topics, T, is fixed at 30, and $\beta=0.1$ and $\alpha=50/T$. Formally, the posterior probability of a word j within document d is given as $$p(w^j | \theta_d) = \prod_k p(w^j | z^k) p(z^k | \theta_d)$$

where k is iterated over all topics, and $\theta_d$ is the topic distribution of document d.

d. Click-based (ALDA) Adapted Latent Semantic Analysis (ALSA) augments LSA-based document summarization algorithm using user query and click information. Specifically, ALSA updates weights of a word in each web-page by the number of times users click on the page after making a query containing the word. This method is applied to LDA such that it fits the experimental setting. When building bag-of-words for a news article, the frequency of words that appear in the headline is boosted by the number of times the article is clicked. When calculating the headline score of words, the same method is used as in LDA above.

For HCTM, T is fixed at 30, $\beta_1=\beta_2=0.1$, and $\alpha_1=\alpha_2=50/T$.

Each model produces a rank-ordered list of headline score for each test document. The predictive power of each model is evaluated based on the following two measures. In summing the result, the macro average over daily average scores is used.

AUC Area Under ROC Curve is widely used to measure performance on binary classification. It takes into account of both true positive rate and false positive rate.

MAP@k Mean Average Precision @k is the mean of the average precision computed on the top k words predicted. The MAP@5, @10 and @20 are computed as headlines have rarely more than 20 words. For cases where the headline have less than 5, 10 or 20 words, the average is calculated on the number of words in the headline.

Figure 7:
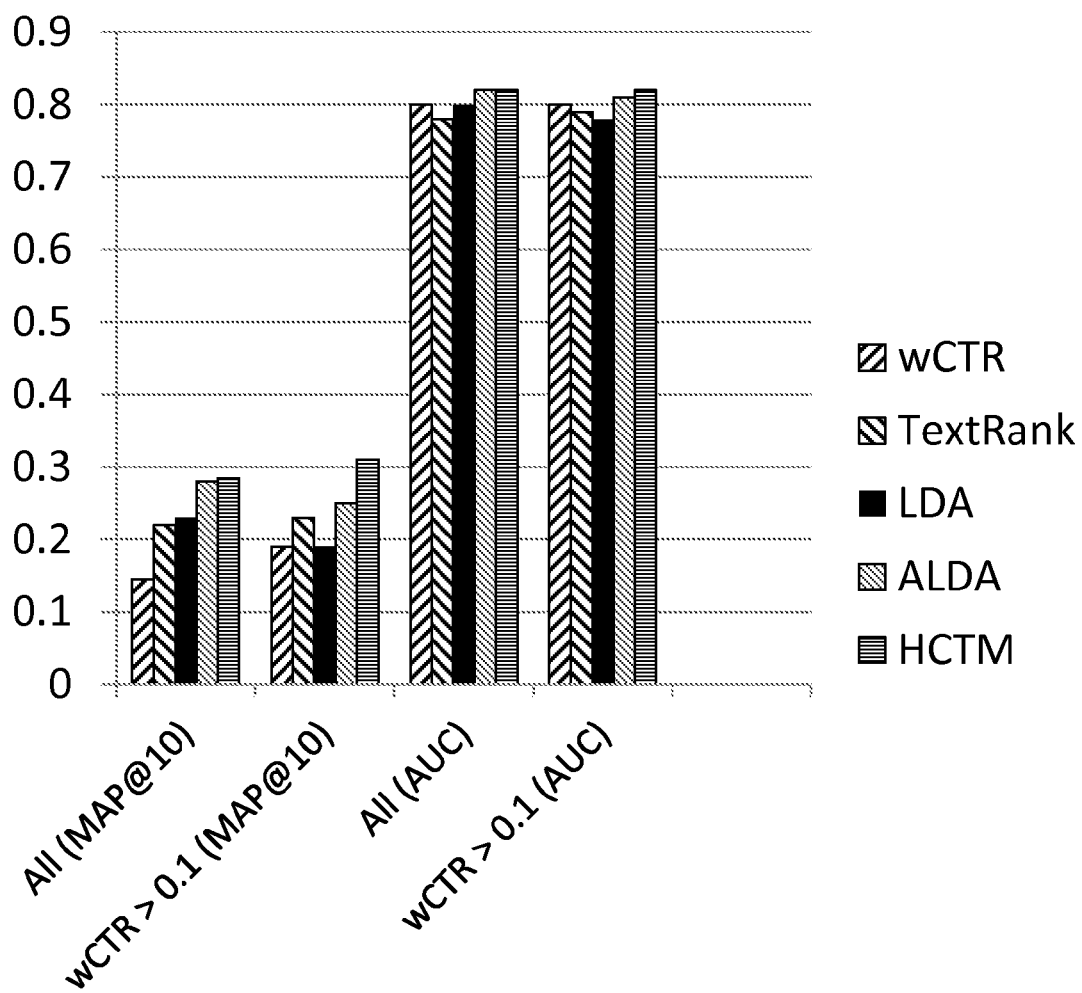
FIG. 7 illustrates a graphical summary of the performance of various models.

FIG. 7 illustrates a graphical summary of the performance of each model used in the evaluation. The evaluation is performed with two different experimental settings. In the first test, how well each model generates the entire words in the headline given a news article is measured. In the second test, the test data is limited to words that have a wCTR value—measured within the test data—that is higher than 0.1, which is equivalent to the top 10% of all vocabulary. This means that, not only is the ability of the method to correctly predict the words of the headline measure, but also to which extent the method can predict important words as measured by the wCTR.

It is interesting to note that the comparative performance of each method exhibits different patterns depending on the experimental setting. In the first test where the task is to predict the entire headline, the performance of the HCTM model is close to ALDA, a state-of-the-art summarization algorithm that utilizes click-through information. However, when the objective of prediction is limited to high click-value words in the second test, the HCTM model significantly outperforms ALDA as well as LDA and TextRank in terms of both MAP and AUC. This illustrates that the HCTM model is able to jointly model topics and click information of news articles in addition to identify topic-specific click-value of each word in the corpus. As a result, the HCTM model produces headline of a given news article that not only well represents thematic summary, but also actually triggers user clicks.

The information presented here is an example of how social community preferences can be automatically used to suggest better headlines. In practice, the proposed model will be used to suggest new words for a news article for which editors have already proposed a headline. In that scenario, a computing device can receive input and suggest to a user the top words not already in the headline ranked by their posterior probability as given by the model. Also, a computing device may assess the quality of the words input by the user for the headline given the model trained on the prior week's data, henceforth capturing the current trend. In this way, such a tool may be very useful in any editorial platform such as Word-Press that integrates for instance an A/B testing package.

Embodiments of the invention include systems and methods for suggesting headlines by exploiting click history data.

By recommending terms associated with currently trending and popular topic, and discouraging the use of terms detrimental to click through, an editor may increase the chances that that a reader will select an article.

The systems and methods are further capable of scoring headlines written by an editor enabling a comparison of headline effectiveness. The score may be used to compare headlines to choose one having a greater popularity or set a threshold level that a headline must exceed before publishing, among other uses.

Method of Implementation

Figure 4:
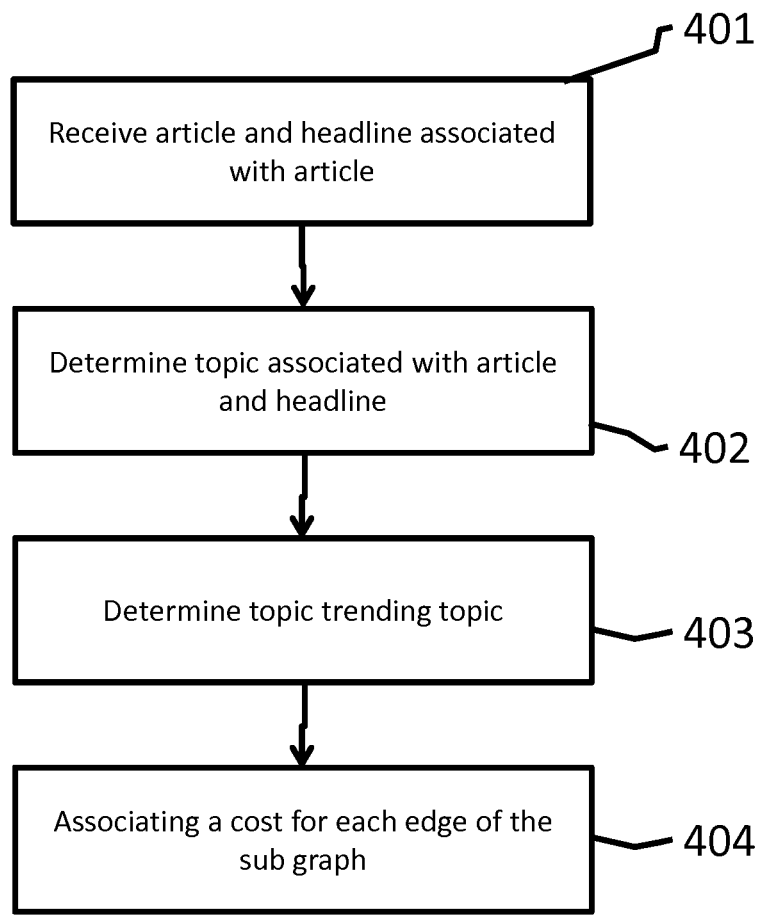
FIG. 4 illustrates a flowchart of a method for suggesting headlines.

Embodiments of the invention include systems and methods for suggesting headlines using historic click data. The systems and methods are configured to suggest headlines based on a user's input and historic click data. FIG. 4 illustrates a high level flowchart of a method 400 for suggesting headlines using historic click data. The steps shown in the flowchart are carried out by a computing device, and each step may be performed by a separate software component of a computing device, or the execution of steps may be combined in one or more software components. The software components may exist on separate computing devices connected by a network, or they may exist on a single computing device. Computer executable instructions for causing the computing device to perform the steps may be stored on a non-transitory computer readable storage medium in communication with a processor.

In box 401 an article and a headline associated with the article are received. The article and originate from a user's client device and transmitted to another computing device. For example, a user may enter an article and headline into a user interface of a client device such as a web page. The client device may then transmit the query to a server over a network.

In box 402 a computing device determine a topic associated with the article and headline. The topic may be determined based on the text of the article. In box 403, at least one word trending in the topic is determined. The word trending in the topic may be determined based on its word click through rate. Words having the highest word click through rate that are relevant to the topic may be determined to be the at least one trending word. In box 404, the at least one trending word is recommended for use in a revised headline. The at least one trending word may be a word included in the original headline, or it may be a word that not included in the original headline.

In some embodiments determining at least one word trending in the topic includes first determining a plurality of words associated with the topic. A topical click value for each word from among the plurality of words is then determined. The at least one word trending in the topic may correspond to words having a higher topical click value. In some embodiments determining the at least one word may include inputting at least a portions of the headline and the article into a headline click-based topic model to determine a word click through rate for at least one word associated with the article. The headline click-based topic model may be trained using search logs and historic click through data. The headline and the article.

Figure 5:
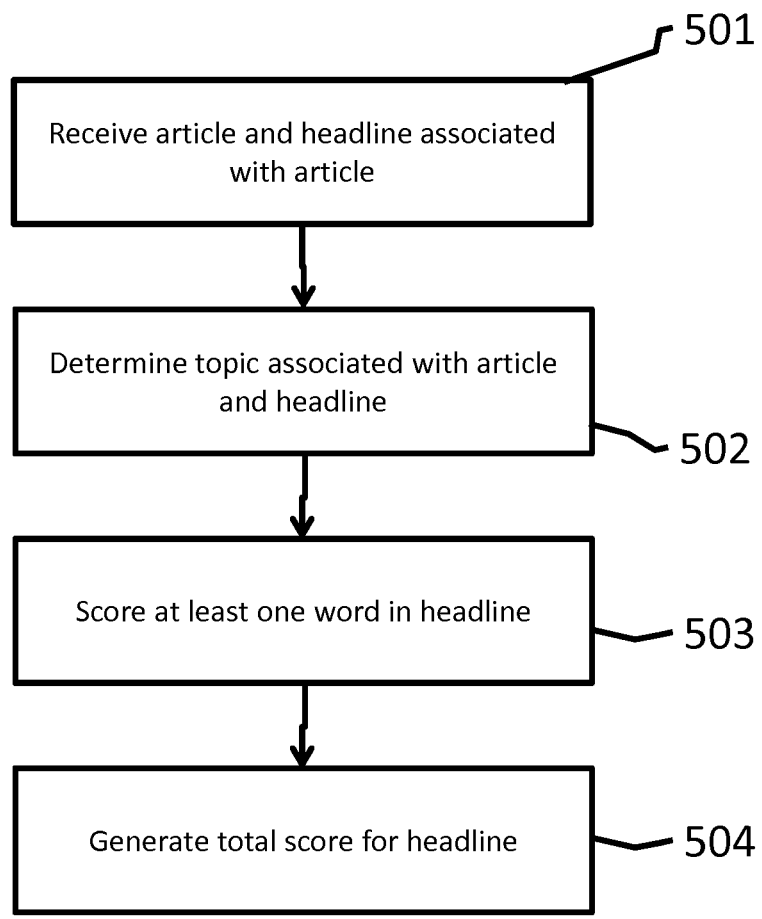
FIG. 5 illustrates a flowchart of a method for evaluating a headline.

Embodiments of the invention may further include systems and methods for evaluating the effectiveness of a headline. FIG. 5 illustrates a high level flowchart of a method for evaluating the effectiveness of a headline. In box 501, an article and a headline associated with the article are received at a computing system. In box 502, a computing device determines a topic associated with the article and headline. In box 503 at least one word is scored in the headline of the article based on trending words in the topic associated with the article. Every word in the article may be given a score, or a subset of words may be scored. A headline score is then determined in box 504 for the entire headline. The headline score is indicative of the relative likelihood of the headline being clicked through by a user.

In some embodiments the method may suggest additional words to include in the headline in addition to providing a headline score. If a word has a very low click through score, it may be recommended for removal from the headline in some embodiments. The score for each word in the headline may be determine using a headline click-based topic model and determining a word click through rate for the word in the title. The headline click-based topic model may be trained using historic search data and click through data.

Figure 6:
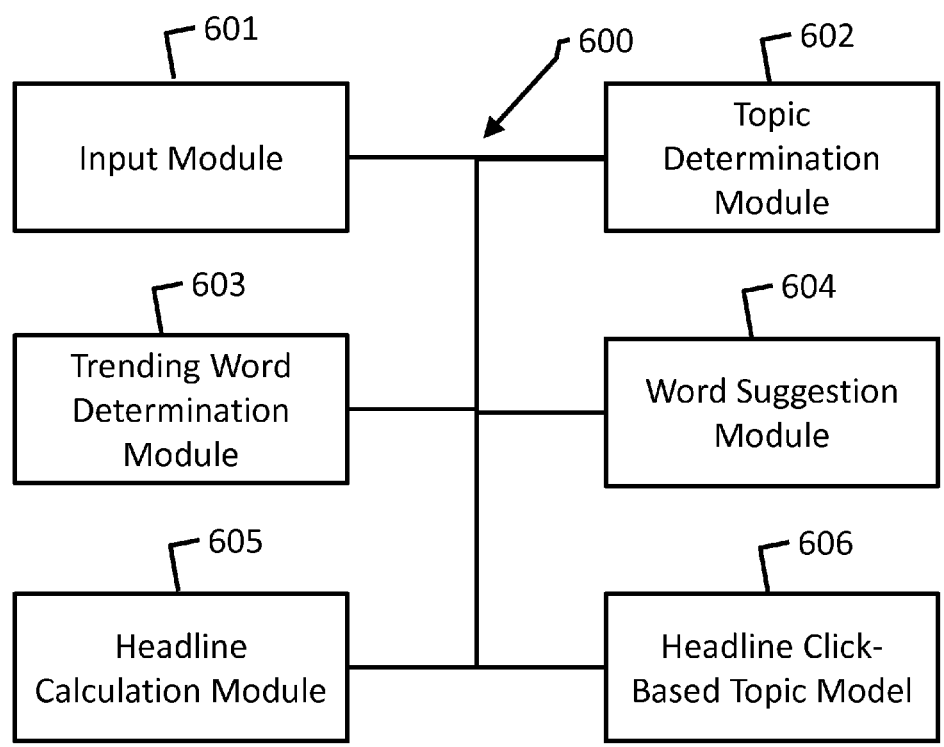
FIG. 6 illustrates a system for suggesting headline terms.

FIG. 6 illustrates a system diagram of a system for suggesting headline terms. The system is comprised of computer executed modules that perform functions in a computing device. Each module may be executed by separate computing devices or they may be executed on a single computing device. The computer executed modules are configured to perform a series of functions. An input module 601 is configured to receive an article and a headline associated with the article. For example, the input module could be configured to receive the article over a network, or locally through a user interface. A topic determination module 602 is configured to determine a topic associated with the article. The topic may be based on the words contained within the article. A trending word determination 603 module determines at least one word trending in a topic associated with the article. A word click through rate assign module assigns a word click through rate to at least one word trending in the topic.

In some embodiments the system further includes a word suggestion module 404 configured to suggest at least one word from among the words trending in the topic based on its word click through rate. For example, the suggestions module may recommend the trending words having the highest word click through rate. In another embodiment the system further includes a headline calculation module 605 configured to calculate a headline click through rate score based on the word click through rate of at least one word. For example, the headline calculation module may sum the word click through rates of each word or phrase in the headline to obtain a headline click through rate score. The headline click through rate score may then be evaluated against different headlines to determine headlines most likely to be clicked through.

The system 600 may further include a headline click-based topic model module for implement a headline click-based topic model. A data module may be configured to receive historic search data and historic click through data and a training module may be configured to train the click-based topic model module using the data received by the data module. The word click through rate may be determined using the trained headline click-based topic model.

From the foregoing, it can be seen that the present disclosure provides systems and methods for suggesting words for use in a headline to increase click through rates of the headlines. The suggested words are more likely to be clicked through while still being relevant to the underlying article. Thus, the systems and methods allow an editor to increase readership of an article or compare different headlines of an article.

The foregoing description have been restricted to study the impact of words (unigrams and bigrams) on the click through rate, and how the user implicit feedback on the news platform can be used to improve the headline. However, other related studies, on news popularity forecasting have shown that other signals, mostly extracted from user generated content, can be used as well.

While various embodiments have been described above, it should be understood that they have been presented by way of example only, and not limitation. It will be apparent to persons skilled in the relevant arts) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A computer implemented method for suggesting headlines, comprising:
training a machine learning topic model using search logs and historic click through data to account for the potential of a word in a headline to induce a click;
receiving, at a computing device, an input of a headline and an article associated with the headline;
determining, by a computing device, a topic associated with the article and headline;
determining a plurality of words associated with the topic;
inputting each of the plurality of words associated with the topic into the trained machine learning topic model to determine a topical click value for each of the plurality of words;
and
recommending at least one word of the plurality of words having a higher topical click value compared to other words among the plurality of words.

2. The method of claim 1, further comprising:
inputting at least a portion of the headline and the article into the trained machine learning topic model to determine a word click through rate for at least one word in the portion of the headline and the article.

3. The method of claim 1, further comprising filtering the search logs and historic click through data to remove common words.

4. The method of claim 1, wherein the at least one word includes at least one bigram formed of two words.

5. A computer implemented method for evaluating the effectiveness of a headline, comprising:
training a machine learning headline click-based topic model using search logs and historic click through data to account for the potential of a word in a headline to induce a click;
receiving, at a computing device, a headline and an article associated with the headline;
determining, by a computing device, a topic associated with the article and headline;
determining a topical click value for at least one word within the headline using the trained machine learning topic model based on trending words within the topic associated with the article and headline; and
determining a headline score based on the topical click value of at least one word within the headline, the headline score being indicative of a relative likelihood of the headline being clicked through.

6. The method of claim 5, further comprising determining at least one recommended word for inclusion in a revised headline and outputting the at least one recommended word, the at least one recommended word resulting in a headline score higher than the determined headline score.

7. The method of claim 5, wherein determining a topical click value further comprises determining a word click through rate for at least one word in the title.

8. The method of claim 5 wherein the at least one word within the headline comprises at least one bigram.

9. A system for suggesting headline terms, comprising:
a processor for executing program code; and
non-transitory computer storage memory, storing program code that, when executed on the processor, causes the system to perform a method comprising:
implementing a machine learning headline click-based topic model;
training the machine learning headline click-based topic model using search logs and historic click through data to account for the potential of a word in a headline to induce a click;
receiving an article and a headline associated with the article;
determining a topic associated with the article;
determining at least one word trending in the topic associated with the article; and
determining a word click through rate for the at least one word trending in the topic using the trained machine learning headline click-based topic model.

10. The system of claim 9, wherein the method further comprises:
suggesting at least one word from among the at least one word trending in the topic based on its word click through rate.

11. The system of claim 9, wherein the at least one word is a word contained in the headline and wherein the method further comprises:
calculating a headline click through rate score based on the word click through rate of the at least one word.

* * * * *